United States Patent
Vaidyanathan et al.

(10) Patent No.: US 8,238,404 B2
(45) Date of Patent: Aug. 7, 2012

(54) METHOD TO IMPROVE ATSC-VSB TRANSCEIVER PERFORMANCE EMPLOYING A TIME-FREQUENCY WAVEFORM PROCESSOR

(75) Inventors: Krishnamurthy Vaidyanathan, Ossining, NY (US); Geoffrey F. Burns, Ridgefield, CT (US)

(73) Assignee: Koninklijke Philps Electronics N.V., Eindhoven (NL)

( * ) Notice: Subject to any disclaimer, the term of this patent is extended or adjusted under 35 U.S.C. 154(b) by 2598 days.

(21) Appl. No.: 10/040,173

(22) Filed: Oct. 23, 2001

(65) Prior Publication Data

US 2003/0078023 A1    Apr. 24, 2003

(51) Int. Cl.
*H04B 1/713* (2011.01)
(52) U.S. Cl. ........................................ 375/132
(58) Field of Classification Search .......... 375/132–137, 375/229, 270, 295, 301, 316, 321, 346, 348; 455/202, 203, 204
See application file for complete search history.

(56) References Cited

U.S. PATENT DOCUMENTS

| | | | |
|---|---|---|---|
| 4,618,996 A * | 10/1986 | Rafal et al. | 455/46 |
| 6,148,020 A * | 11/2000 | Emi | 375/132 |
| 6,337,855 B1 * | 1/2002 | Malkamaki | 370/347 |
| 6,411,644 B1 * | 6/2002 | Myer | 375/132 |
| 6,654,429 B1 * | 11/2003 | Li | 375/316 |
| 6,711,412 B1 * | 3/2004 | Tellado et al. | 455/506 |
| 6,853,689 B1 * | 2/2005 | Nilsson | 375/267 |
| 6,912,258 B2 * | 6/2005 | Birru | 375/340 |
| 2002/0044524 A1 * | 4/2002 | Laroia et al. | 370/203 |
| 2002/0144294 A1 * | 10/2002 | Rabinowitz et al. | 725/139 |
| 2003/0026223 A1 * | 2/2003 | Eriksson et al. | 370/335 |

* cited by examiner

*Primary Examiner* — Kevin Kim

(57) ABSTRACT

A backward compatible enhancement to ATSC-VSB transmissions is provided to enable intra-field channel estimation for better channel equalization. One or more time-frequency waveforms are inserted into the transmitted signal with systematic time and frequency variation synchronized to the currently available field sync. A coherent demodulator may then directly estimate the channel frequency response. The power of the inserted waveform(s) is small compared to the existing 8-VSB signal, such that existing receivers will function as intended with only minimal degradation of performance.

3 Claims, 5 Drawing Sheets

METHOD TO IMPROVE ATSC-VSB TRANSCEIVER PERFORMANCE EMPLOYING A TIME-FREQUENCY WAVEFORM PROCESSOR

TECHNICAL FIELD OF THE INVENTION

The present invention is directed, in general, to channel equalization for wireless communications and, more specifically, to providing a time-frequency waveform for frequency domain channel estimation in a manner which allows existing receivers to continue operating as intended.

BACKGROUND OF THE INVENTION

Within Advanced Television Standards Committee (ATSC) compliant video receivers, trained channel estimation is performed utilizing the field sync available in the ATSC field. However, one trained equalization per field is not sufficiently frequent to estimate even slowly varying channels. Blind equalization techniques applied to intra-field channel estimation have not been entirely successful on all important channels. Other proposals to improve the trained equalization update rate require a new training signal and are therefore not backward compatible with existing systems, and also improve channel estimation at the cost of useful data rate.

One alternative to existing equalization schemes which might improve channel estimation without degrading the data rate is frequency domain equalization. However, current proposals for frequency domain equalization for monocarrier systems such as vestigial sideband (VSB) modulation are essentially time-domain equalization performed in the frequency domain. Coefficients, updates, and finite impulse response (FIR) tap calculations are performed in the frequency domain with the assistance of a fast Fourier transform (FFT) of the incoming data. Since the training sequence is defined only in the time domain, the error calculation must be performed on the filtered data after retransformation to the time domain. The error is then retransformed to the frequency domain for coefficient update. Similar restrictions apply to statistical (blind) and decision directed error calculations.

There is, therefore, a need in the art for improving the training signal available for channel estimation. It would be desirable to provide an enhancement to the training signal without degrading data rate and allowing existing receivers to continue to operate as intended.

SUMMARY OF THE INVENTION

To address the above-discussed deficiencies of the prior art, it is a primary object of the present invention to provide, for use in a wireless communications system, a backward compatible enhancement to ATSC-VSB transmissions enabling intra-field channel estimation for better channel equalization. One or more time-frequency waveforms are inserted into the transmitted signal with systematic time and frequency variation synchronized to the currently available field sync. A coherent demodulator may then directly estimate the channel frequency response. The power of the inserted waveform(s) is small compared to the existing 8-VSB signal, such that existing receivers will function as intended with only minimal degradation of performance.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
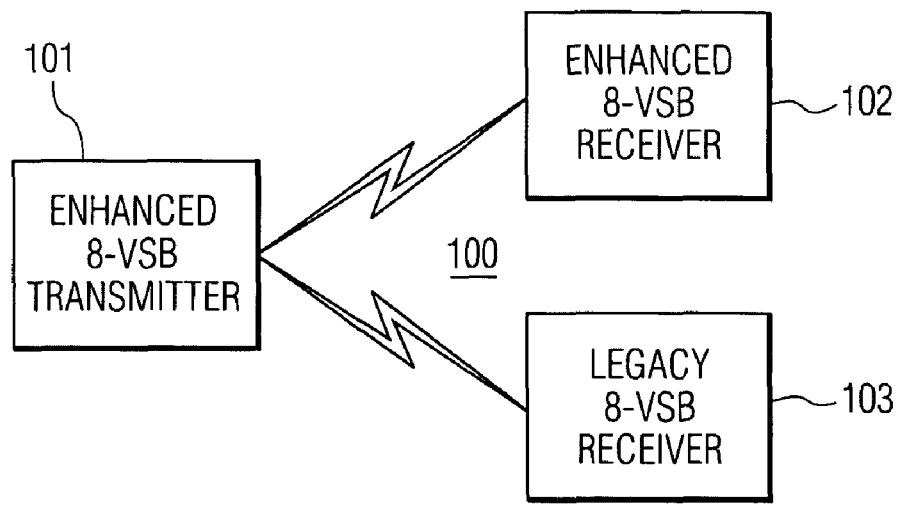
FIG. 1 depicts a wireless communications system according to one embodiment of the present invention.

FIG. 1 depicts a wireless communications system according to one embodiment of the present invention. Wireless communications system 100 includes a transmitter 101 providing enhanced signal transmission in accordance with the present invention, with the transmitted signal including a time-frequency waveform as described in further detail below. Wireless communications system 100 also includes a receiver 102, which may be one of a plurality of such receivers, receiving the signals transmitted by transmitter 101 and capable of demodulating the enhanced signal, including the ability to employ the time-frequency waveform for channel estimation in accordance with the present invention. Wireless communications system 100 may optionally include one or more other "legacy" receivers 103 receiving the signals transmitted by transmitter 101 and, although incapable of employing the time-frequency waveform, able to demodulate the received signal.

In the present invention, transmitter 101 and receivers 102 and 103 are preferably video (including associated audio) receivers operating according to the Advanced Television Standards Committee (ATSC) standard for vestigial sideband modulation with eight discrete levels (8-VSB). Alternatively, however, the present invention may be employed within other wireless communications systems including voice (telephony) systems, data (e.g., Internet access) systems, or hybrid video/voice, video/data, voice/data, or video/voice/data systems.

True frequency domain equalization is achieved in the present invention through the addition of pilot tones in the transmitted signal. For VSB, the additional pilot tone(s) supplement the tone (field sync) applied to assist carrier recovery. To avoid compromising the carrier recovery function of the original pilot tone while concurrently providing a better measurement of the channel characteristics, the supplemental pilot tone is varied, preferably so that the resulting spectrum of the supplemental pilot tone is flat when measured over several frequency domain transform symbols. The identical frequency distribution is systematically produced and/or replicated in both the transmitter 101 and the receiver 102 using, for example, a linear shift register pseudo-random number sequence to control the frequency position of the supplemental tone. Accordingly, a frequency sweep of the channel is achieved.

Figure 2:
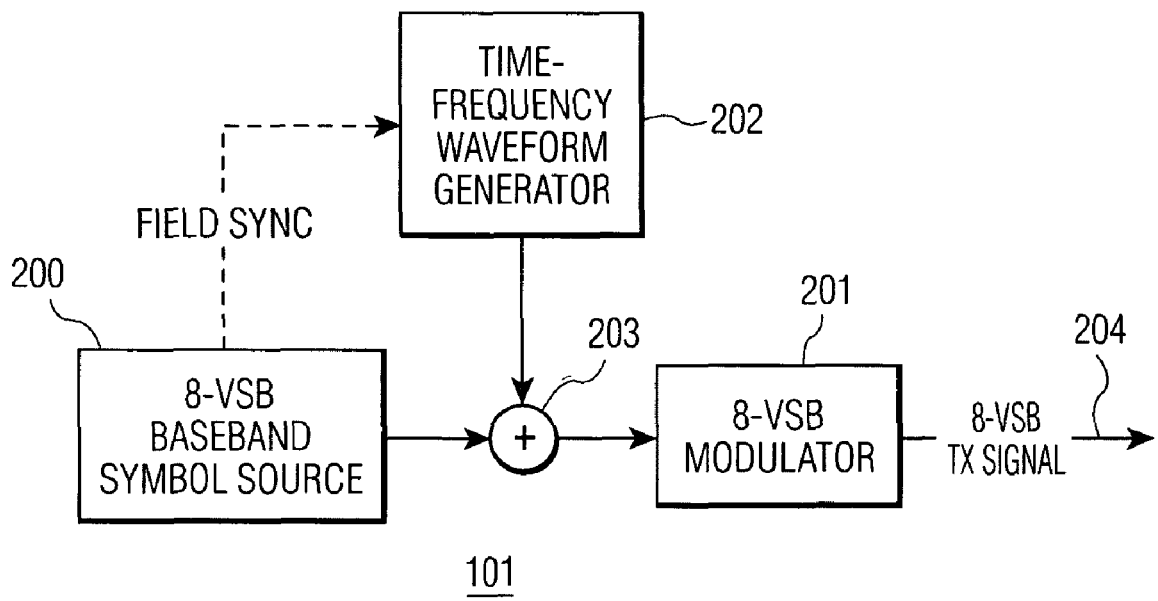
FIG. 2 depicts in greater detail an enhanced transmitter producing a signal including a time-frequency waveform for wireless communications according to one embodiment of the present invention.

FIG. 2 depicts in greater detail an enhanced transmitter producing a signal including a time-frequency waveform for wireless communications according to one embodiment of the present invention, and is intended to be read in conjunction with FIG. 1. Transmitter 101 includes an 8-VSB baseband signal source 200 producing symbols for the data or information to be transmitted in accordance with the known art, as well as an 8-VSB modulator 201 encoding symbols by modulation of a carrier signal, also in accordance with the known art.

In the present invention, transmitter 101 additionally includes a time-frequency waveform generator 202, the output of which is combined with the output of signal source 200 by signal adder 203. The 8-VSB transmission signal 204 output by the modulator 201 thus includes modulation of the time-frequency waveform produced by waveform generator 202 as well as the symbols produced by signal source 200.

The time-frequency waveform produced by generator 202 is preferably a set of stepped sinusoids, each of approximately 1024 samples in length with a magnitude 30 decibels (dB) below the baseband signal. The frequency of the waveform is stepped up by a number derived from the bandwidth (e.g., 6 MHz) and the per sweep resolution desired (e.g., 6 MHz/128). To achieve better per-sweep resolution, more than one sinusoid is added at different frequencies per time segment. To achieve better intra-sweep resolution, the frequency position of the sinusoids is continually varied from one time segment to another. In the exemplary embodiment, the time-frequency waveforms produced by generator 202 are frequency-hopping sinusoids with a magnitude 30 dB below the data signal, where the frequency hops every 1024 samples (approximately 100 µs) and sweeps the entire band in 128 segments. The frequency hops follow a predetermined sequence synchronized with the field sync signal.

Figure 3:
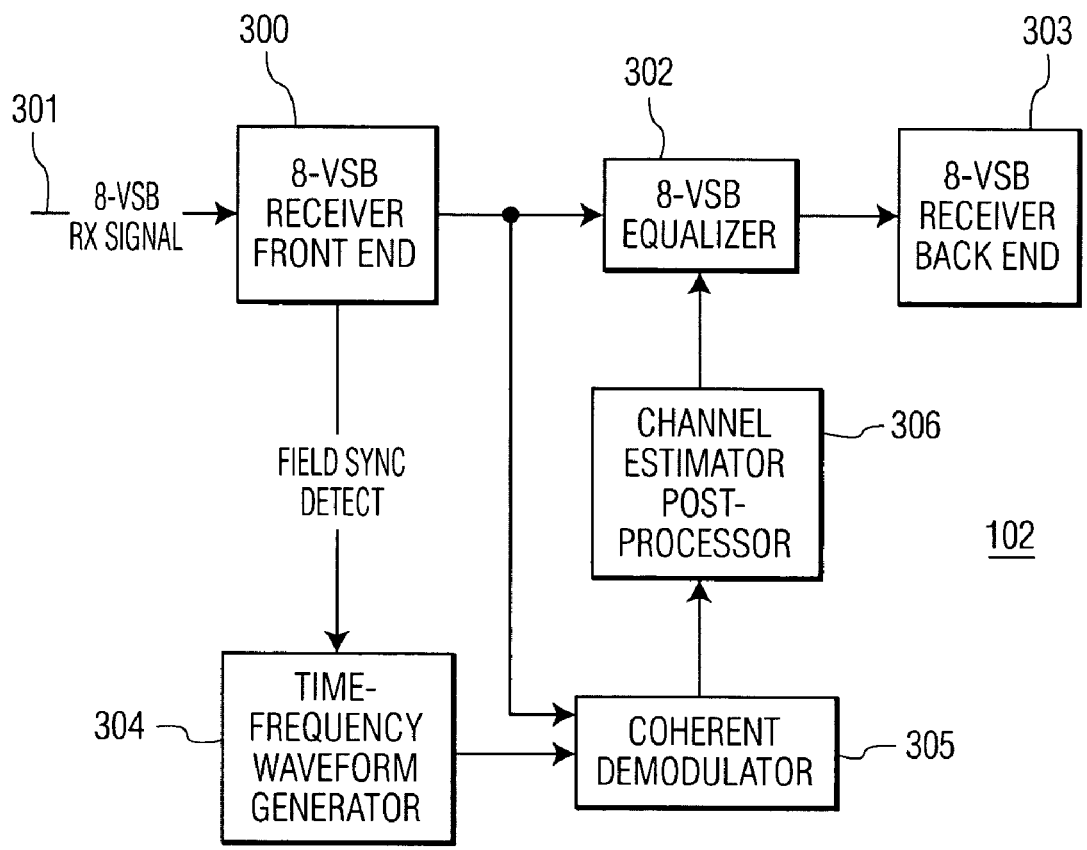
FIG. 3 depicts in greater detail an enhanced receiver utilizing a signal including a time-frequency waveform for channel estimation relating to wireless communications according to one embodiment of the present invention.

FIG. 3 depicts in greater detail an enhanced receiver utilizing a signal including a time-frequency waveform for channel estimation relating to wireless communications according to one embodiment of the present invention, and is intended to be read in conjunction with FIGS. 1 and 2. Enhanced receiver 102 includes a conventional 8-VSB receiver front end 300 performing such functions as carrier recovery and field sync detection. Enhanced receiver 102 receives and 8-VSB received signal 301, which is the 8-VSB transmission signal 204 after transmission within, and alteration by, the wireless channel between transmitter 101 and receiver 102.

Enhanced receiver 102 also includes a conventional 8-VSB channel equalizer 302 performing channel equalization signal correction or compensation on the output of front end 300 based upon a received channel estimate, and a conventional 8-VSB receiver back end 303 performing such functions as symbol decoding on the channel equalized output of equalizer 302.

Receiver 102 also includes a time-frequency waveform generator 304 producing an identical waveform to that produced by generator 202 within transmitter 101. Generation of the predefined time-frequency waveform is triggered by detection of a field sync signal. The initial frequency of the sinusoids is already known by design or, alternatively, a cyclic sequence of frequencies may be employed with the initial frequency for a particular field communicated in the reserved bits of the field sync signal.

The time-frequency waveform produced by generator 304 is employed, together with data samples from front end 300, by coherent demodulator 305 to produce a channel estimate. A set of discrete time oscillators, one for each frequency, are initialized and the input data samples are multiplied and integrated over the period of the time segment. That is, a local sinusoid generator is employed to generate the time-frequency waveform, a sample-by-sample multiplication with the received signal is performed, and a running sum is computed by an accumulator. The output of the accumulator is sampled once in every time segment (1024 samples), providing an estimate of the received amplitude and phase of the sinusoid, and then reset. For the next time segment, the same oscillators are initialized with new sinusoids, each with a new frequency systematically varied from the previous frequency. At the end of the sweep, the entire frequency domain characteristic of the channel is known. Because the frequency hops every 1024 samples and sweeps the entire bands in 128 segments, approximately 3 channel estimates may be performed for a given field. The channel is thus estimated approximately every 8 ms, sufficient for use with a channel changing at 50 Hz (20 ms intervals) or less.

The output of the accumulator is a matched filter output directly giving a frequency domain estimate of the channel for a single point in the spectrum. Therefore the time series output of the accumulator directly samples the frequency response of the channel and no fast Fourier transform (FFT) is required. However, the channel estimate may be used directly by a frequency domain equalizer, or else transformed to time domain equalizer coefficients.

The channel estimate produced by the coherent demodulator 305 may be further refined by the use of a channel estimator post-processor 306, which smooths the estimate, tracks time varying fades, and makes Doppler estimates.

By proper design of the time-frequency waveform, frequent estimation of the channel is feasible utilizing simple time domain processing. By performing coherent demodulation at the receiver, the power of the inserted waveform may be kept very small to permit transmission along with the currently specified system, thereby maintaining the pay load rate. By retaining the existing field sync and synchronizing the inserted time-frequency waveform to that field sync, backward compatability with legacy receiver(s) 103 is achieved while providing a means to dynamically estimate the channel.

Figure 4A:
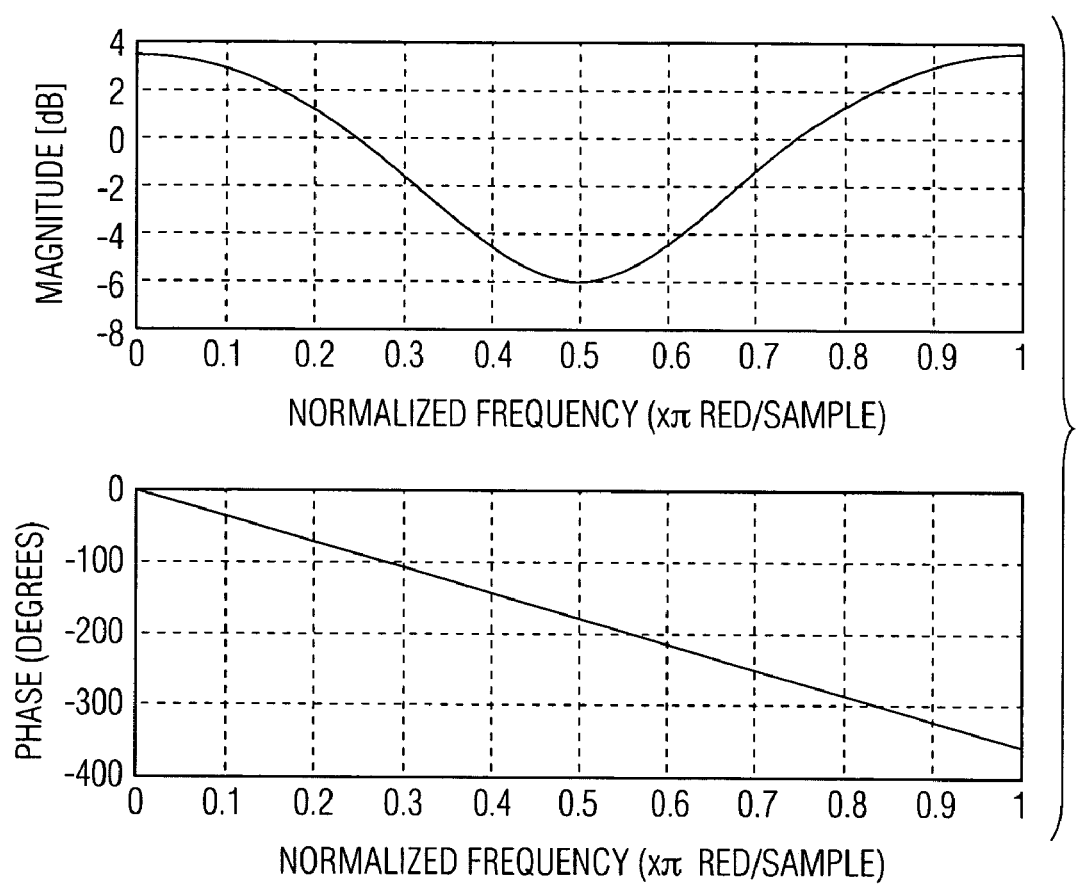
FIGS. 4A and 4B are plots of simulation results for actual channel characteristics and estimated channel characteristics according to one embodiment of the present invention.
Figure 4B:
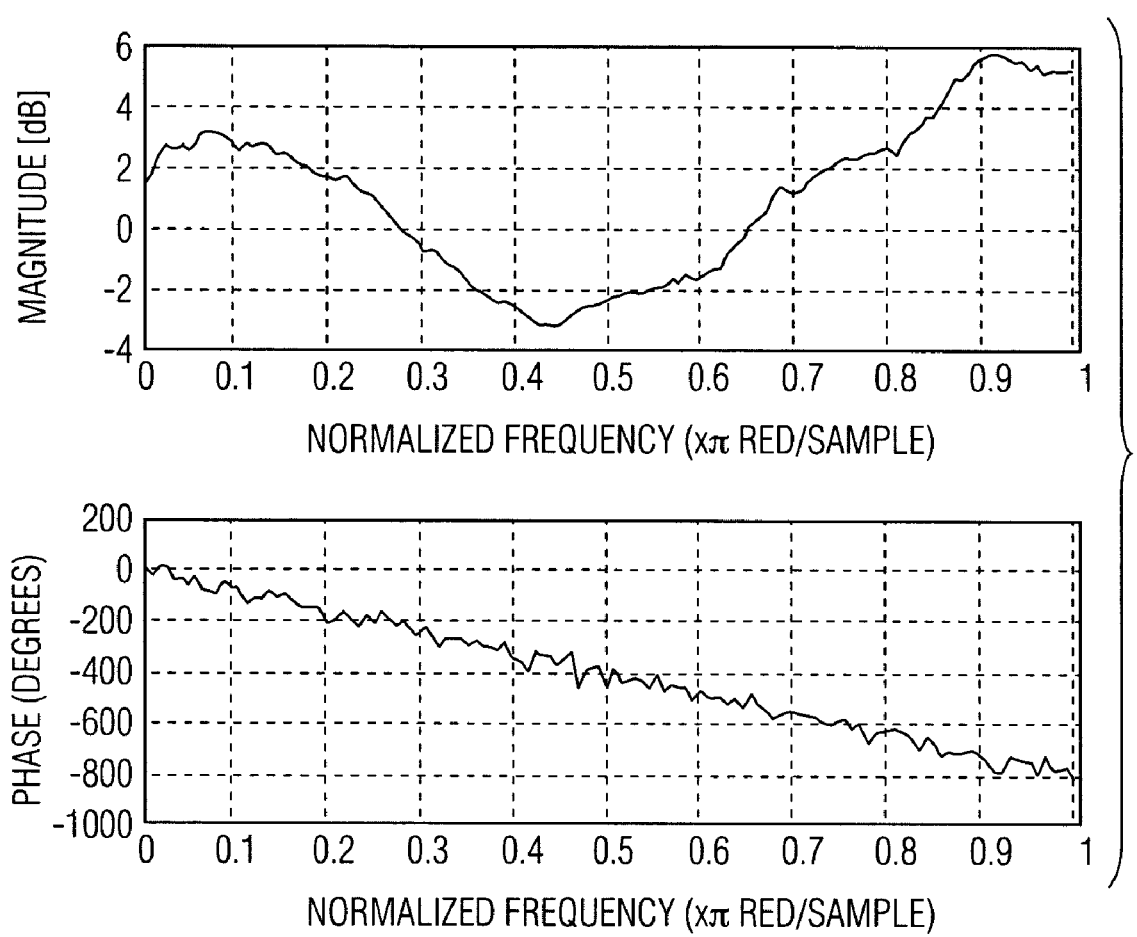

FIGS. 4A and 4B are plots of simulation results for actual channel characteristics and estimated channel characteristics according to one embodiment of the present invention. FIG. 4A depicts actual channel characteristics, while FIG. 4B depicts a channel estimate at the output of a coherent demodulator deriving the channel estimate from a data signal applied to the channel utilizing the process described above.

Figure 5:
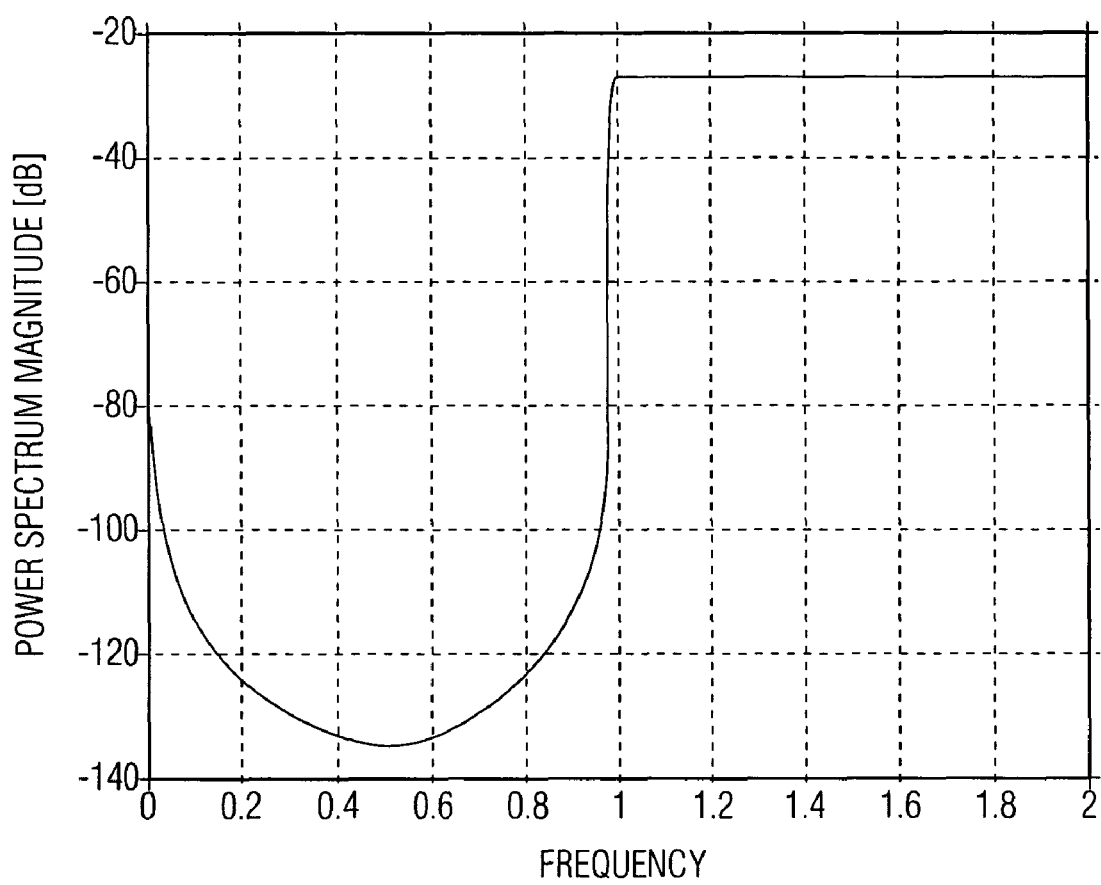
FIG. 5 is a plot of the spectral power density of the time-frequency waveform inserted into the monocarrier signal according to one embodiment of the present invention.

FIG. 5 is a plot of the spectral power density of the time-frequency waveform inserted into the monocarrier signal according to one embodiment of the present invention. The maximum signal power is approximately −30 dB.

The present invention enables efficient channel decoding at high throughput wireless communication receivers such as digital television receivers, and may be incorporated into new terrestrial television standards or enhancements of the existing ATSC-VSB standard.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A transmitter for improved wireless communications comprising:
    a symbol source producing a data signal;
    a waveform generator producing a time-varying signal that changes frequency during each of a plurality of periods, wherein the frequency changes from one period to a subsequent period in a predetermined sequence of frequencies within a channel to be employed in transmitting the data, the predetermined sequence being coordinated with a field sync within the data signal; and
    a modulator producing a transmission signal from a sum of the data signal and the time-varying signal.

2. A method for improved wireless communications, comprising:
    producing a data signal;
    producing a time-varying signal that changes frequency during each of a plurality of periods, wherein
        the frequency changes from one period to a subsequent period in a predetermined sequence of frequencies within a channel to be employed in transmitting the data, the predetermined sequence being coordinated with a field sync within the data signal; and
    producing a transmission signal from a sum of the data signal and the time-varying signal.

3. A method for using a wireless communication signal, comprising:
    providing a data signal; and
    summing at least one supplemental signal with the data signal, the at least one supplemental signal having a frequency that changes during each of a plurality of periods in a predetermined sequence of frequencies for a channel in which the wireless communication signal is transmitted, the predetermined sequence being coordinated with a field sync within the data signal.

\* \* \* \* \*